United States Patent
Goirand

[15] 3,662,691
[45] May 16, 1972

[54] AERIAL ROPEWAY VEHICLE SYSTEM

[72] Inventor: Pierre Goirand, Grenoble, France

[73] Assignee: Societe Generale de Constructions Electriques et Mecaniques (Alsthom), Grenoble, France

[22] Filed: Mar. 24, 1970

[21] Appl. No.: 22,278

[30] Foreign Application Priority Data

Mar. 27, 1969 France..................................6908609

[52] U.S. Cl.................................104/173, 104/87, 104/166, 104/204
[51] Int. Cl. ......................................B61b 9/00, B61b 11/00
[58] Field of Search....................104/87, 89, 91, 93, 112, 173, 104/178, 202, 204, 205, 206, 207, 208, 209, 166; 105/148, 150

[56] References Cited

UNITED STATES PATENTS 2,752,883  7/1956  Curtis....................................118/316
3,118,393  1/1964  Ohlin.....................................104/166

FOREIGN PATENTS OR APPLICATIONS 1,148,401  12/1957  France..................................105/148

Primary Examiner—Arthur L. La Point
Assistant Examiner—Robert Saifer
Attorney—Sylvester J. Liddy, John J. Hart, Joe E. Daniels and Charles E. Baxley

[57] ABSTRACT

In the aerial ropeway vehicle system herein, when a vehicle arrives at a station at which is provided a carriage rail, its driven connection to the towing cable is broken and simultaneously its load is taken up by the stationary carriage rail and it is connected to a local rotating cylinder drive system. The local drive system is constructed to decelerate the vehicle in a given manner and to accelerate the vehicle as it leaves the station to be again connected to the towing cable.

8 Claims, 4 Drawing Figures

INVENTOR.
PIERRE GOIRAND

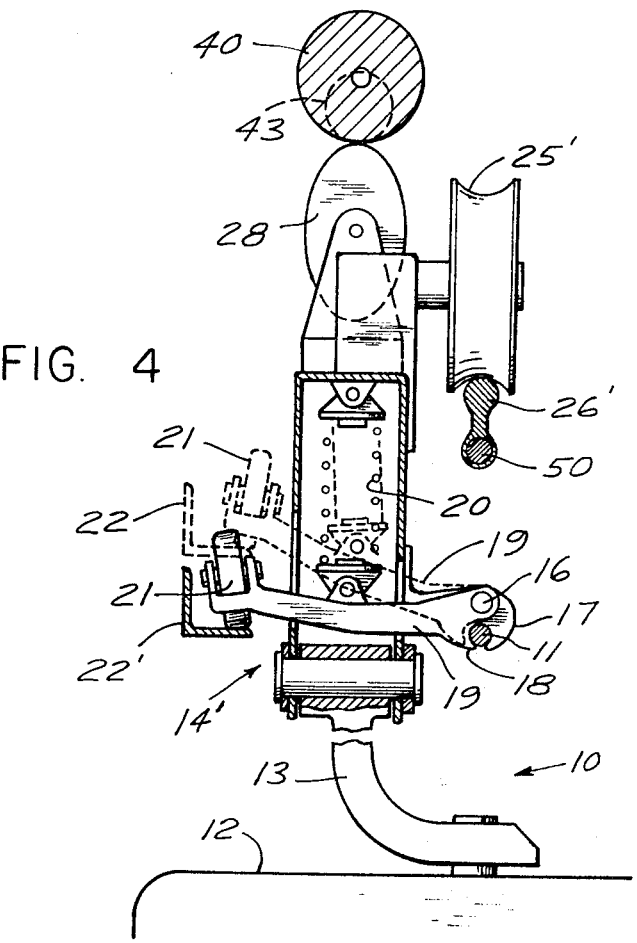
FIG. 4
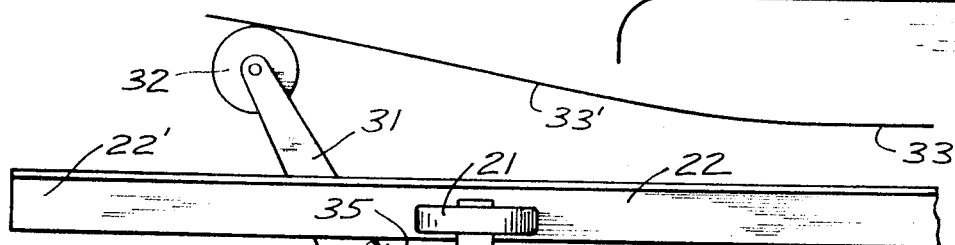
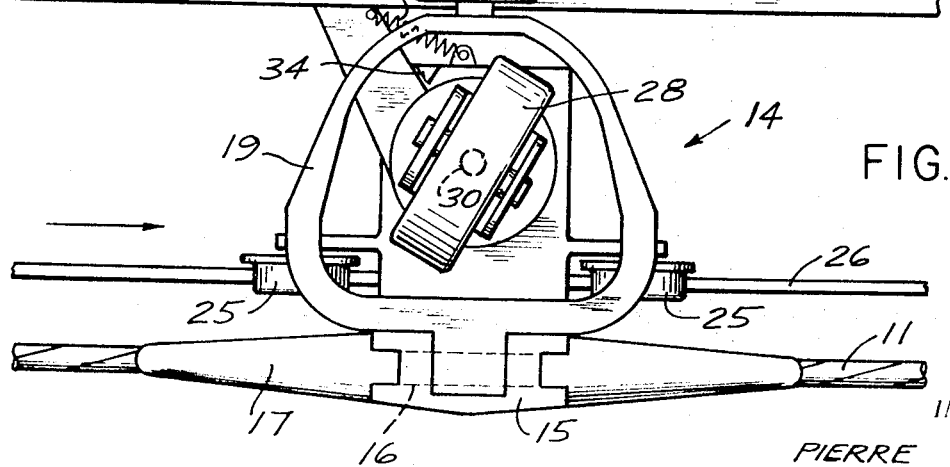
FIG. 3
INVENTOR
PIERRE GOIRAND
BY
ATTORNEY

3,662,691

AERIAL ROPEWAY VEHICLE SYSTEM

This invention relates to an aerial ropeway vehicle system wherein the vehicles are towed by cables between stations. In a single cable aerial ropeway system, the entire load of the vehicles is borne by the towing cable, whereas in a twin-cable aerial ropeway system one cable carries the weight of the vehicles, while the other cable is used solely to tow the vehicles.

The primary purpose of the present invention is to provide in systems of the indicated types an arrangement for successively transferring the loads of the vehicles or carriages arriving at a station from the load bearing cable to a carriage rail provided at such station, and to control the speed of the carriage as it passes through such station.

In systems of the indicated type, each of the vehicles is suspended from a truck provided with a clamp which grips the towing cable so that as the latter moves longitudinally throughout the path of travel between stations, the clamped vehicle is towed along such path. In accordance with the invention, the truck of each vehicle has mounted thereon a freely rotatable drive roller which when the vehicle enters a station comes into engagement with a rotating cylinder disposed to provide a generatrix parallel to the direction of movement of the vehicle. The drive roller and cylinder are so constructed and arranged that as the vehicle enters the station, they apply to the vehicle a driving speed equal to that of the towing cable. At the same time the traction clamp is released from the towing or traction cable. The traction clamp and its release system are so constructed and arranged that the high torque required to open the clamp acts in the same direction as that in which the drive roller is brought to bear against the cylinder. There is thus automatically produced a high bearing pressure of the roller on the cylinder, thereby ensuring that the vehicle load will be effectively taken up by the station drive system exactly when the traction clamp releases the vehicle from the drive of the towing cable, and that the vehicle will be maintained in vertical equilibrium without the necessity of any special lateral guiding arrangements. Once the clamp is so released, the vehicle can be decelerated by the drive roller and cylinder according to a set program. Such deceleration may be accomplished by orienting the drive roller in a given manner with relation to the rotational speed of the cylinder, or by having the roller bear against a conical drive surface.

Also in accordance with the invention, if the system is of the single cable type, the carriage supporting rail at the station is disposed in a vertical plane situated between a vertical plane through the longitudinal center line of the towing cable, and a vertical plane through the drive cylinder center line, the carriage drive roller being located underneath the rotating cylinder. As a result of this arrangement, when the carriage or vehicle load is taken up by the rail, the carriage suspension point moves with respect to its center of gravity so that the carriage is subjected to a rocking torque which brings the roller into contact with the cylinder. Preferably, the point of application of the clamp release force is located in a vertical plane on the same side of the towing cable as the rail and cylinder and is directed upwardly so as to reduce the force required to obtain the necessary bearing pressure of the roller against the cylinder.

In the twin-cable type of system, the carriage support rail lies in a vertical plane through the towing cable center line, the carriage drive roller is located underneath the rotating cylinder, and the point of application of the clamp release force lies in a vertical plane located on the same side of the rail as the cylinder, such force being directed upwardly to produce the necessary adhesion between the roller and cylinder.

It is believed that a better understanding of the invention will be obtained by a perusal of the following description when read in connection with the accompanying drawings, in which;

FIG. 3 is a diagrammatic plan view of certain of the parts shown in FIG. 2; and

FIG. 4 is a view similar to FIG. 2 showing the arrangement of the parts as the vehicle enters a station in a twin-cable aerial ropeway system.

In the drawings, similar numerals have been applied to similar parts in the several views.

Figure 1:
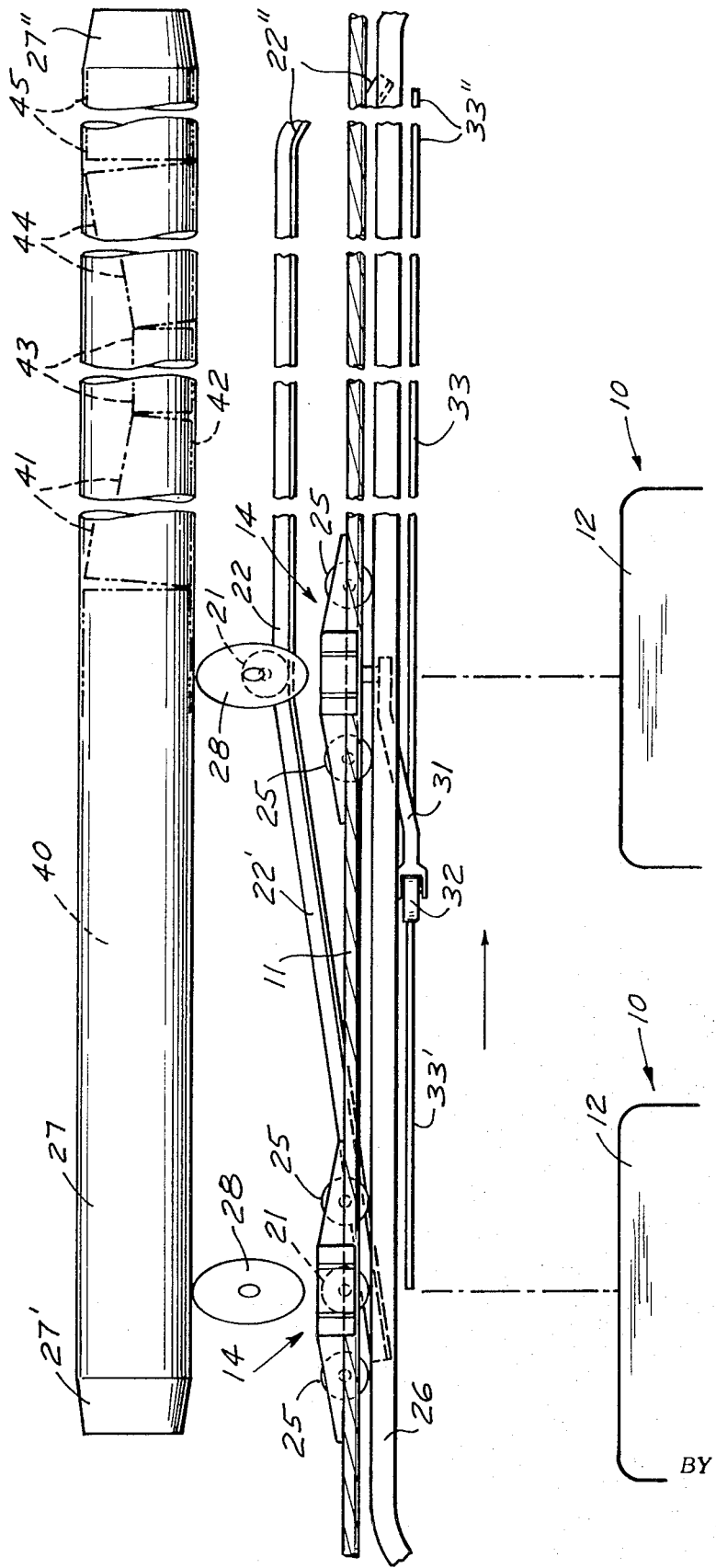
FIG. 1 is a partial diagrammatic, side elevational view showing vehicles entering a station in a single cable aerial ropeway system, the parts depicted in such figure being observed from the right as viewed in FIG. 2 of the drawings.
Figure 2:
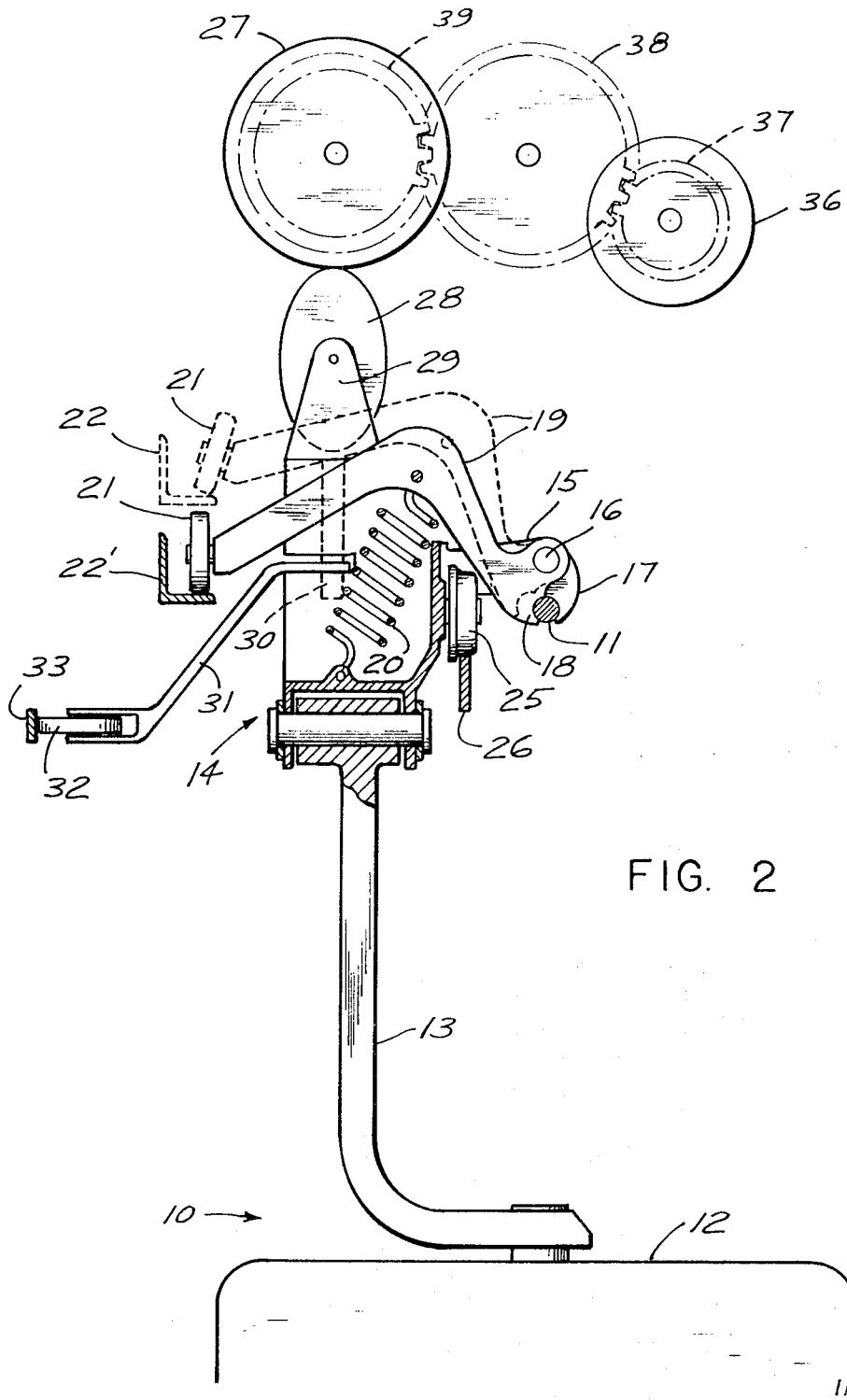
FIG. 2, is a diagrammatic, vertical sectional view through one of the vehicle trucks shown in FIG. 1 and showing in dotted outline the manner in which the clamp is moved to released position when the vehicle load is taken up by the carriage rail.

Referring now more particularly to FIGS. 1-3 of the drawings which illustrate the manner in which the invention may be embodied in a single cable aerial ropeway system, the reference numeral 10 generally designates the vehicles which are both supported and moved by a tow or traction cable 11. The vehicles are each composed of a vehicle body 12 which is suspended from the carrier and towing cable 11 by a member 13 depending from a truck 14 on which is secured a clamp carrier 15 having a fixed jaw 17. Provided on the clamp carrier 15 is an axle pin 16 to which is pivotally connected one end of a movable clamp member 19 having a movable jaw 18 on such pivoted end thereof. A spring 20 normally maintains the jaw 18 of the clamp member 19 in closed position to couple the vehicle 10 to the cable 11. Provided on the other end of the clamp member 19 is a roller 21 which engages with a rail 22 as the vehicle enters a station. The rail 22 is designed to raise the clamp member 19 as it moves into the station to release the towing cable 11 from the grip of the movable clamp jaw 18 and thereby uncouple the vehicle from the towing cable 11. In FIG. 1 of the drawings, the rail 22 is shown provided with an inclined entry end 22' with which the roller 21 engages as it enters the station. In FIG. 1, the roller 21 of the left hand vehicle as viewed in such figure is just coming into engagement with the inclined entry end 22' of rail 22, while the right hand vehicle in such figure has advanced far enough into the station so that its roller 21 is traveling along the raised body portion of rail 22. The roller 21 of a vehicle is shown in solid lines in FIG. 2 of the drawings as it is just engaging the inclined entry end 22' of the rail 22 and with the jaw 18 of the clamp member 19 still gripping the carrier and towing cable 11. The dotted line position of the clamp member 19 in FIG. 2 shows how it is raised by the rail 22 against the tension of spring 20 to release the cable 11 from the grip of its movable jaw 18 as the vehicle moves further into the station. As a vehicle leaves a station an inclined discharge end 22'' of the rail 22 (in FIG. 1) permits the clamp member 19 to return to its cable clamping condition under the influence of spring 20.

The truck 14 of the vehicle is also provided with wheels 25,25 which perform no function during the movements of a vehicle between stations, but which as soon as a vehicle enters a station, ride up on a carriage rail 26 which takes up the weight of the vehicle from the towing cable 11. The entry end of the rail 26 may be slightly inclined as shown in FIG. 1 to facilitate the wheels 25 riding up thereon. The body of rail 26 is located to one side of the centerline of the towing cable 11 and between such cable and the rotational axis of a drive cylinder 27 located above the truck 14 of the vehicle and extending generally parallel to the rail 26 and cable 11. It will be observed that before the rail 26 takes the load of the vehicle by reason of the latter's wheels 25 riding up on such rail, the vehicle as suspended from the towing cable 11 so that its center of gravity is contained in a vertical plane positioned on the other side of the centerline of the towing cable. Thus, when the vehicle enters a station and its load is taken up by rail 26, its point of suspension will be displaced to the left with respect to its center of gravity, as viewed in FIG. 2, thereby producing a clockwise rocking torque on the vehicle. This rocking movement of the vehicle will bring a drive roller 28 mounted on the carriage truck 14 into contact with the cylinder 27. The roller 28 is rotatably mounted on a swivel bearing bracket 29 supported on the truck 14 for pivotal movement about a fixed axis by means of a vertical pivot pin or shaft 30. Secured to the shaft 30 is one end of an arm 31 provided at its outer end with a freely rotatable roller 32 engageable with a stationary ramp 33 provided at the station.

It will be understood from the foregoing that the vehicle is driven solely by the cylinder 27 during its run through the station and that its speed while so being driven by the cylinder 27 is controlled by the orientation of the roller 28 with relation to the surface of such cylinder. The orientation of the roller 28 during the travel of the vehicle through the station is in turn controlled by the profile design of the ramp 33 which extends generally in substantial parallelism with the body of the rail 22. It will be noted in FIG. 3 of the drawings that the roller bearing arm 31 is normally maintained in abutment against a boss 34 provided on the truck 14 by a return spring 35 connected to the truck 14 and such arm 31. The boss 34 is located so that when the arm 31 is so engaged therewith as shown in FIG. 3, the drive roller 28 is provided with an orientation such that the drive produced by the cylinder 27 will move the vehicle at a speed equal to that given it by the towing cable 11. At its entry end 33' the ramp 33 is inclined to facilitate the engagement of the advancing roller 32 with it and to move the arm 31 away from the abutment 34 against the tension of spring 35 to give the roller an orientation corresponding to the required deceleration program. The body portion of ramp 33 corresponds to the movement of the vehicle through the station at a constant reduced speed after deceleration. As is shown in FIG. 1 the discharge end 33'' of the ramp 33 is also inclined to give the roller 34 an orientation corresponding to the required acceleration program for building the speed of the vehicle up until it is again equal to the speed of the towing cable.

The drive cylinder 27 has a length greater than the length of the ramp 33 and less than that of the rail 26 so that at the entry and departure ends of the station it will be enabled to drive the vehicle along the portions of rail 26 adjacent to the entry and discharge ends of the ramp 33 at a speed equal to that imparted to the vehicle by the towing cable 11. The entry end of the cylinder 27 may be in the form of a cone 27' to enable it to take up the load, especially when the roller 28 is fixed against orientation and the ramp 33 eliminated, a construction that will hereinafter be described. The discharge end 27'' of the cylinder may also be conically formed to facilitate the discharge of the load from such cylinder as the vehicle departs from the station. The cylinder 27 is driven continuously at a given controlled speed to provide its surface with a controlled certain continuous movement or peripheral speed comparable to that desired for the control of the speed of the vehicle through the station. This rotational movement of the cylinder 27 may be accomplished in any suitable manner, as by a motor 36 mounted on the station structure and connected by suitable gearing 37 and 38 to a gear 39 secured to one end of the cylinder 27 as indicated in FIG. 2 of the drawings.

It will be understood from a consideration of FIGS. 1-3 of the drawings in the light of the aforesaid description, that when a vehicle enters a station embodying this invention, the wheels 25,25 thereof will ride up on the carriage rail 26. The vehicle will rock in a clockwise manner as viewed in FIG. 2 to transfer the load of the vehicle to the rail 26. This rocking action of the vehicle will also cause the drive roller 28 to come into engagement with the drive cylinder 27. At this time the arm 31 controlling the orientation of the drive roller 28 will be in engagement with the abutment 34. Under such conditions, when the roller 28 comes into engagement with the entry end of the cylinder body beyond the conical portion 27' of such cylinder, the vehicle will be driven by the cylinder and roller at a constant speed equal to that imparted to the vehicle by the towing cable to which it is still coupled. After a brief moment at such constant speed in the station, the roller 21 will come into engagement with the inclined end 22' of the rail 22 (note the left hand vehicle shown in FIG. 1 of the drawings). As the roller 21 rides up such inclined portion 22', the clamp arm 19 will be pivoted upwardly about the axle pin 16 to withdraw the movable jaw 18 on such clamp arm from the towing cable 11 (note FIG. 2 of the drawings). The vehicle will thus be uncoupled from the towing cable and will be driven solely by the cylinder 27 and roller 28. Due to the fact that the lifting force on the mobile clamp arm 19 is directed upwardly, the roller 28 will automatically be caused to engage the cylinder 27 with a high bearing pressure, thereby ensuring that the vehicle load will be effectively taken-up by the station drive system simultaneously with the uncoupling of the vehicle from the towing cable 11. Immediately after the vehicle is disengaged from the towing cable the roller 32 on the orienting arm 31 of the drive roller 28 will engage the inclined entry end 33' of the ramp 33, to swivel the roller 28 so that the speed of travel of the vehicle in the station is decelerated to the desired constant speed as set by the body portion of such ramp 33. As the vehicle starts to leave the station the roller 32 will come into engagement with the departure end 33'' of ramp 33 to cause the orientation of the drive roller 28 to be changed to cause the speed of the vehicle to be accelerated to the point where it is again equal to that at which it will be towed by the carrier cable 11. The above described operations associated with the vehicle as it enters the station will occur in reversed order at the vehicle leaves the station i.e., the clamp will again be caused to grip the cable, and the wheels 25 will run off the discharge end of the rail 26 thereby disengaging the drive roller 28 from the drive cylinder 27 so that the vehicle will then be moved solely by the cable 11 as the vehicle travels to the next station.

Instead of effecting the deceleration and acceleration of the vehicle in the station by means of a swiveling drive roller 28, the orientation of which is controlled by an orienting arm 31 and ramp 33, such means may be dispensed with as shown in the embodiment of FIG. 4 of the drawings, and the vehicle motion accomplished by fixing the roller bracket 29 in a given position on the truck 14, either permanently or adjustably, to provide it with a given orientation relative to the driving cylinder means and constructing the latter to effect the results desired. As is indicated by the dotted lines in FIG. 1 of the drawings, the modified cylinder means may be constituted of a series of sections, either integrally formed or connected together in any suitable manner, such as, by universal joints of the type shown in U.S. Pat. No. 3,164,104, issued Jan. 5, 1965 to W. A. Hunt. The entry end of the cylinder means is constituted of a true cylindrical section 40 designed to drive the roller 28 so as to give the vehicle entering the station a speed equal to that imparted to it by the towing cable 11. The length of section 40 is such that such speed is imparted thereby to the vehicle until after the clamp arm 19 has been actuated to uncouple the vehicle from cable 11. Following section 40 is a cone-shaped section 41 having a generatrix 42 which is parallel to the direction of vehicle motion and in alignment with the generatrix of the cylindrical section 40. The cone-shaped section 41 is designed to effect deceleration of the vehicle after the uncoupling of the clamp in the same manner as the entry portion 33' of the previously described ramp 33 when the roller 28 is of the swiveling type. The movement of the carriage or vehicle through the station at a constant low speed after deceleration is accomplished by a following cylindrical section 43 having a diameter similar to the diameter of the cone 41 at its tip and a generatrix in alignment with the generatrix 42 of the cone. At the discharge end of the cylindrical section 43 there is provided a conical section 44 similar to that of cone 41 but reversed so that as the drive roller 28 travels along its generatrix which is in alignment with that of a cylindrical section 43, the vehicle will be accelerated up to the speed of travel of the towing cable 11. At the discharge end of the cylinder means a terminal cylindrical 45 is provided similar in design to that of cylinder section 40 so that the station driving means will drive the vehicle at a constant speed similar to that of the towing cable while the vehicle is being recoupled to the towing cable for its travel to the next station.

FIG. 4 of the drawings shows the application of the invention to a twin-cable aerial railway system in which the vehicle 10 is suspended in its travels between stations from a carrier cable 50 through wheels 25' mounted on the truck 14' of the vehicle. The vehicle is moved between stations by a towing cable 11 to which it is coupled by the fixed jaw 17 and the movable jaw 18 of a clamp mounted on the truck 14'. When the vehicle enters a station it rides up on a fixed carriage rail 26' mounted in overlying relation to the section of the carrier cable 50 extending through the station. The entry and discharge ends of the carriage rail 26' are configured to form ramps by which the wheels 25' may readily ride up on the rail from the carrier cable and down from such rail onto the carrier cable. As in the embodiment of FIGS. 1–3, when the rail 26' takes up the load, the drive roller 28 initially comes into engagement with the cone-shaped end 27' of the cylinder means and then comes into engagement with a cylindrical portion of such means to produce a drive which will move the vehicle at a speed equal to that of the towing cable 11. After a short run of the vehicle on the rail 26' at the speed of the towing cable, the mobile clamp jaw 18 which is normally kept clamped tight on the towing cable by its spring 20, is raised as the roller 21 on the outer end of the clamp arm 19 bears against rail 22 in the same manner as described with respect to such mechanism in the embodiment of FIGS. 1–3. When this occurs the vehicle will be released from the towing cable so that the vehicle is thereafter driven toward the discharge end of the station solely by the drive roller 28 and the associated drive cylinder means. In the construction illustrated in FIG. 4 of the drawings, the drive roller 28 is fixed with respect to the truck 14' so that the drive cylinder means will be constituted of the previously described sections 40, 41, 43, 44 and 45. If the truck 14' is provided with a swivel type roller as in the embodiment of FIGS. 1–3, the cylinder means is constituted of cylinders of the type of cylinder 27 in FIG. 1 and the orientation of such drive roller is controlled by an arm 31, roller 32 and rail 33 in the manner previously described in the discussion of FIGS. 1–3.

It will be observed from FIG. 4 of the drawings, that in the twin-cable construction, the carriage support rail 26' lies in a vertical plane containing both the carrier cable 50 and the towing cable 11 and that as the vehicle rides up onto the carriage rail 26' it is lifted to bring the carriage drive roller 28 into engagement with the drive cylinder means. As in the embodiment of FIGS. 1–3, the carriage drive roller 28 is located underneath the rotating cylinder means and the point of application of the clamp release force lies in a verticle plane on the same side of the rail 26' as the cylinder means and is directed upwardly to produce the additional pressure which will ensure the effective take-up of the drive of the vehicle as soon as the release from the towing cable 11 is accomplished. The order of the operations of the aforesaid parts of the twin-cable arrangement will be similar to that described with respect to the construction shown in FIGS. 1–3 of the drawings.

I claim:

1. An aerial ropeway vehicle system, including a vehicle, cable means for carrying and towing the vehicle along a given path, clamping means comprising a movable clamping jaw carried by said vehicle for coupling the latter to said cable means, and a station in the path of movement of said vehicle and comprising a carriage rail arranged to take up the load of said vehicle from said cable means as the vehicle enters said station and during its passage therethrough, rotating drive means located on one side of said carriage rail and having a surface configuration affording a lower generatrix disposed generally parallel to the direction of movement of the vehicle through the station, means for rotating said rotating drive means at a given speed of rotation, a freely rotatable drive roller mounted on said vehicle and located underneath said drive means when the vehicle is in said station, said carriage rail, said rotating drive means and said drive roller being so constructed and arranged that when the load of the vehicle is transferred to said carriage rail, said drive roller is brought into engagement with said rotating drive means, the entry end portion of said rotating drive means having a given surface configuration such that when said drive roller engages the lower generatrix of such end portion the vehicle will be moved at a given speed corresponding to the orientation of said drive roller, means presetting the orientation of said drive roller so that when it is engaged with said end portion the vehicle will be driven at a speed equal to that imparted thereto by said cable means, and means operable to open said clamping means to uncouple said vehicle from said cable means while said drive roller is engaging said entry end portion of said rotating drive means, said operable means including actuator means connected to said movable jaw, and means for applying a force to said actuator means to withdraw said movable jaw from said cable means, said actuator and force applying means being so constructed and arranged that the force applied to said actuator means to open the clamp means is in a direction to increase the bearing pressure of said drive roller on said rotating drive means so as to ensure the transfer of the vehicle drive on the release of said clamp means, without substantially disturbing the vertical equilibrium of the vehicle.

2. The system defined in claim 1, in which said actuator means comprises an arm connected to said movable clamping jaw and mounted for pivotal movement about a horizontal axis, and spring means connected to said actuator arm and normally positioning the latter to maintain said movable clamping jaw closed, and in which said force applying means comprises a roller mounted on said actuator arm and a rail engageable by said roller, said actuator arm, roller and rail being constructed and arranged to apply an upwardly directed clamp opening force to said actuating arm to move the latter against the tension of said spring means to withdraw said movable clamping jaw.

3. The system defined in claim 1, including means operative after the clamp means are released to reorient said drive roller to decelerate said vehicle according to a set program.

4. The system defined in claim 1, in which said rotating drive means has a portion following said entry end portion thereof and having a surface configuration such as to cooperate with said drive roller to decelerate the vehicle according to a set program after the clamp means are released.

5. The system defined in claim 4, in which said rotating drive means has a cylindrically shaped entry end portion, and said following portion thereof has a conically shaped surface arranged to provide a lower generatrix in alignment with the lower generatrix of said entry end portion, and in which said rotating drive means has a second cylindrically shaped portion following said conical surface and of a diameter the same as that of the smaller end of said conical surface.

6. The system defined in claim 1, in which said rotating drive means is located to one side of said carriage rail and said cable means, and in which the place of application of the force applied by said force applying means to said actuator means is on the same side of said carriage rail and said cable means as said rotating drive means, said force applying means applying an upwardly acting force to said actuator means.

7. The system defined in claim 6, in which said carriage rail is located between said cable means and said rotating drive means so that as the load of the vehicle is taken up by said rail there is produced a displacement of the point of suspension of the vehicle with respect to its center of gravity such as to cause the vehicle to rock in a direction to bring said drive roller to bear against said rotating drive means.

8. The system defined in claim 1, in which said carriage rail has a surface configuration such that said vehicle is lifted vertically to bring said drive roller to bear against said rotating drive means.

* * * * *